United States Patent [19]
Donauer et al.

[11] Patent Number: 6,093,056
[45] Date of Patent: Jul. 25, 2000

[54] BATTERY RECEPTACLE

[75] Inventors: Herbert Donauer; Wilhelm Erdmann, both of Wedemark, Germany

[73] Assignee: Sennheiser electronic GmbH & Co. KG, Wedemark, Germany

[21] Appl. No.: 09/059,917

[22] Filed: Apr. 14, 1998

[30] Foreign Application Priority Data

Apr. 15, 1997 [DE] Germany .......................... 197 15 545

[51] Int. Cl.⁷ .................................................. H01R 3/00
[52] U.S. Cl. ............................ 439/500; 429/96; 429/100; 439/385
[58] Field of Search ................................ 439/500, 385; 429/96, 100

[56] References Cited

U.S. PATENT DOCUMENTS

| | | | |
|---|---|---|---|
| 4,965,141 | 10/1990 | Suzuki | 429/100 |
| 5,055,704 | 10/1991 | Link et al. | |
| 5,372,395 | 12/1994 | Yang | 429/96 |
| 5,413,499 | 5/1995 | Wright, Jr. et al. | 439/500 |
| 5,532,080 | 7/1996 | Mizoguchi et al. | |
| 5,805,423 | 9/1998 | Wever et al. | 439/500 |
| 5,823,820 | 10/1998 | Patel et al. | 439/500 |
| 5,830,007 | 11/1998 | Fry et al. | 439/500 |

FOREIGN PATENT DOCUMENTS

| | | |
|---|---|---|
| 1408610 | of 1972 | United Kingdom . |
| 1481068 | of 1974 | United Kingdom . |
| 1487604 | of 1974 | United Kingdom . |
| 1522446 | of 1977 | United Kingdom . |

OTHER PUBLICATIONS

UK Search report, Jun. 8, 1998, 1pg.

*Primary Examiner*—Neil Abrams
*Assistant Examiner*—Hae Moon Hyeon
*Attorney, Agent, or Firm*—McAulay Nissen Goldberg & Kiel, LLP

[57] ABSTRACT

A battery receptacle particularly adapted for a cuboid 9V battery has a first (end) wall which is made concave by mutually inclined surfaces provided by shape determining sections. The end of the battery is urged into engagement with the inside concave surface of the first wall by a biased electrical contact at the opposite end of the receptacle. The biased contact provides a first arresting device which is supplemented by a second arresting device provided by a torsion spring which is disposed to urge the battery laterally or vertically against a lid or side of the receptacle when the receptacle is closed. The concave inside of the end wall and the arresting means cooperate to prevent the battery rattling in the receptacle. This is a particular benefit when the receptacle is part of a portable device which includes or is a microphone.

11 Claims, 3 Drawing Sheets

BATTERY RECEPTACLE

BACKGROUND OF THE INVENTION a) Field of the Invention

The present invention relates to a battery receptacle for a 9V battery or other accumulator. It especially concerns a receptacle in a microphone or other electronic device, in particular wireless portable hand-held transmitters, pocket transmitters, receivers and radio equipment. In the rest of the description, "battery" should be taken to mean "battery or accumulator" unless otherwise stated.

b) Description of the Related Art

Battery receptacles are known in which size variations in the batteries are compensated for by the insertion of filling or insulating material in order to site the battery relatively securely. For this purpose foam is frequently used which, because of poor mechanical strength and its rapidly decreasing flexibility, only has a short service life.

Using a screw to secure the battery into the receptacle is another known solution. By tightening a screw, the size variation is compensated. By applying a sufficiently large axial force via the screw, the applied contact pressure on the battery and the support may be enough to prevent the battery from sliding laterally.

OBJECT AND SUMMARY OF THE INVENTION

The primary object of the present invention is to further develop the battery receptacle so that batteries are sited securely to prevent displacement and consequent clattering in the battery receptacle even in the event of an impact.

It has to be ensured that the battery is retained in all possible directions of movement so that no clattering noises are produced. This is indispensable, in particular, for devices in which a microphone is installed, which amplify clattering noises. A mechanically robust, rapid and easily operated receptacle is required.

Accordingly, the present invention provides a battery receptacle for batteries of varying size having at least one arresting device and a first substantially concave wall, against which the battery abuts and is laterally retained.

The invention fulfills the aforesaid objects.

The first wall may be inwardly and continuously curved.

In a preferred embodiment of the battery receptacle, the concave wall is formed by several mutually inclined surfaces which may comprise a flat central part and an inclined edge region at the periphery of the wall. The concave shape ensures that the battery is cupped by and always abuts the wall at at least two points, such as two opposite straight edges of a cuboid 9V battery, so that it cannot slip. The central part has to be smaller than the smallest dimension separating the points where contact might occur with the first wall and the inclined edge regions have to extend to a size which is at least the largest separation of the potential contact points of the battery, i.e., the minimum and maximum tolerances for the battery.

It is particularly preferred in the battery receptacle of the invention that the arresting device is a resilient element biased towards the interior of the receptacle to contact the battery and apply pressure without mechanical settings having to be altered even where batteries of a range of dimensions may be received in the receptacle.

In an advantageous embodiment of the invention, at least one side wall is hinged and/or detachable. It is therefore easily possible to exchange a battery without the use of tools.

In a further development of the battery receptacle, the first side wall is hinged and for arresting purposes engages in a retaining device opposite an articulation. This arrangement of the concave retaining wall manages with just two resilient retaining devices for a cuboid battery, for example, a 9V battery. The tolerances of two edge lengths are compensated by the two resilient retaining devices and at the same time the battery is retained in these two directions of movement. The tolerance of the remaining third edge length is compensated by the special shape of the wall and the battery is immediately fixed in this third direction of movement.

With the battery receptacle according to the invention, a hinged first wall is preferably secured by a retaining device enhanced by an applied force, so that the hinged first wall is not detached from the retaining device even by a shock.

It is particularly preferred that the force required for securing the retaining device is produced by an arresting device acting on the battery. The use of an elastic force to fix the battery and of a counter force to retain the hinged first wall at the retaining device reduces the expenditure on manufacture and material.

In a further embodiment of the battery receptacle, at least one wall is provided with a contact, in particular for a 9V battery or accumulator, so that a secure electrical connection can be produced between the contacts of the battery and those of the battery receptacle.

A microphone or an electronic device, in particular a wireless portable hand-held transmitter, pocket transmitter, receivers and radio equipment, are preferably equipped with a battery receptacle as specified by the invention. Portable devices equipped with batteries or accumulators for the power supply are frequently moved and for this reason are subject to shock loading. A battery receptacle according to the invention effectively prevents the movement of the battery and the clattering noises associated therewith caused by such shock loading.

Embodiments of a battery receptacle according to the invention will now be described, by way of example only, with reference to the accompanying drawings.

DESCRIPTION OF THE PREFERRED EMBODIMENTS

Figure 1:
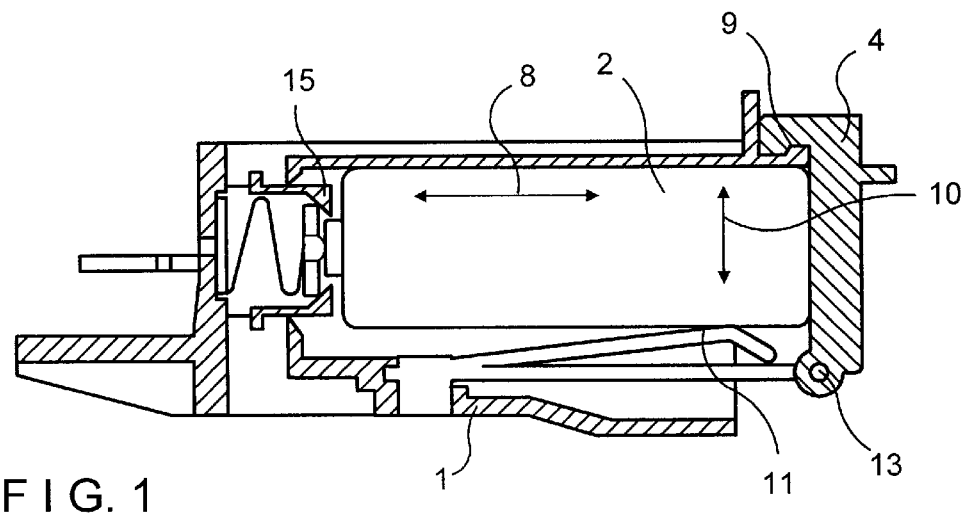
FIG. 1 shows a side elevation in section of a first embodiment.
Figure 2:
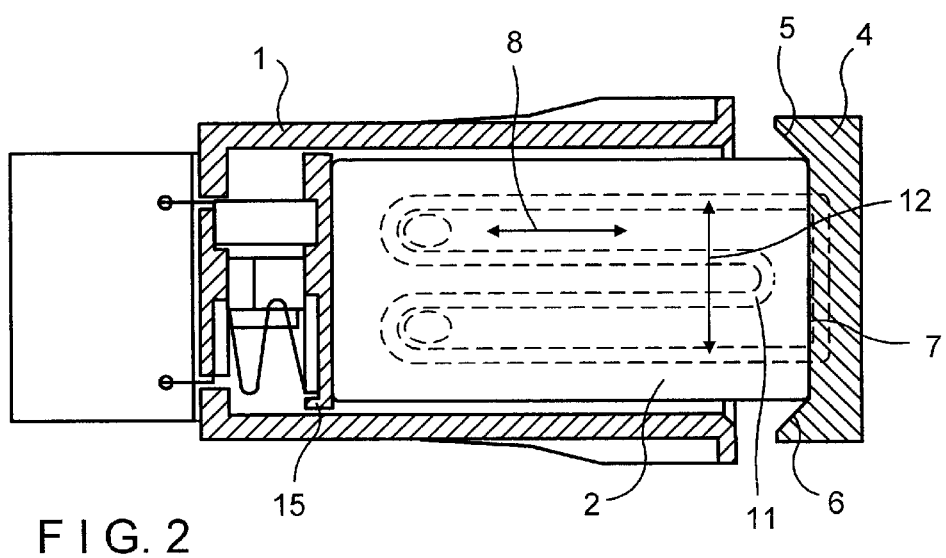
FIG. 2 shows a plan section of the battery receptacle of the first embodiment accommodating a small battery.
Figure 3:
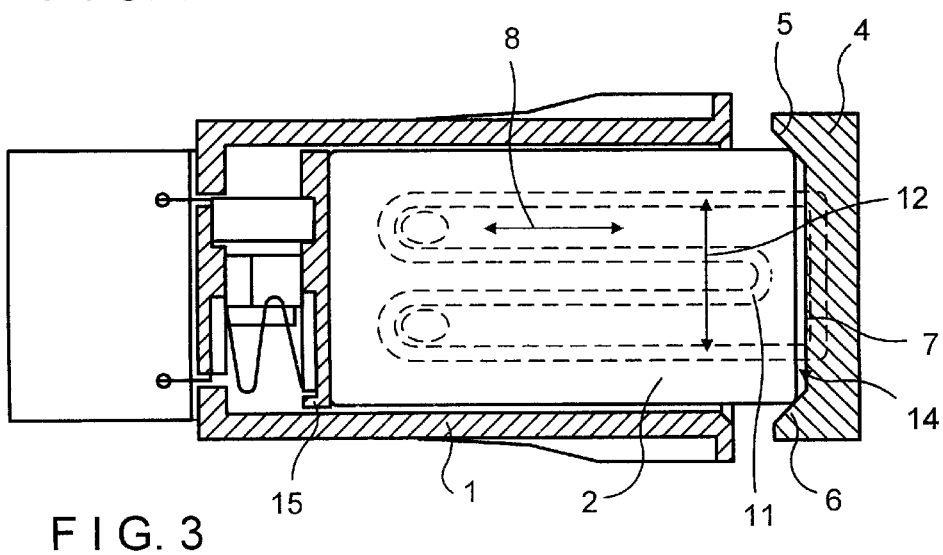
FIG. 3 shows a plan section of the battery receptacle of the first embodiment of FIG. 1 accommodating a large battery.

Represented in FIGS. 1 to 3 is a first embodiment of a microphone battery receptacle 1 in which is accommodated a battery 2. It contains a hinged first wall 4, which is movably connected by an articulation 13 to an arresting device 11 and engages with a retaining device 9.

An arresting device 11 is disposed in the battery receptacle 1 to exert pressure on the battery 2 when the battery receptacle 1 is closed. A shock force which tends to move the battery in the direction of arrow 10 is thus countered by a counter force applied to the battery via the pressure of arresting device 11 and consequently prevents batteries of any size being able to move to and fro in the direction 10. At the same time, the counter-force ensures that the first wall 4 cannot disengage the retaining device 9.

A battery contact 15 also designed as an arresting device forces the battery 2 against the first wall 4 when the receptacle is in the closed state and consequently ensures the electrical connection between the contacts of the battery 2 and the receptacle 1. Because the contact 15 is displaceable, the size of the battery in the longitudinal direction is accommodated. Unwanted displacement of the battery in the direction of arrow 8 is prevented and the battery 2 seats securely on the first wall 4.

The inside of the first wall 4 is concave to provide further compensation for variations in battery size and prevents movement in the lateral direction indicated by arrow 12. The inside of the wall has inclined edge regions provided by shape-determining sections 5, 6 and 7 and their interaction with the battery 2 are represented in FIGS. 2 and 3. The shape determining can best be seen in the plan views of FIGS. 2 and 3. An inner or central section 7 is flat and bounded by shape determining sections 5 and 6 on opposite edges which provide inclined surfaces, these in combination define the concave part of the wall 4. The inclined surfaces slope towards the central section 7 and act as ramps to centralize the battery 2. As can be seen in FIG. 2, a narrow battery 2 seats against the shape determining sections 5 and 6 very close to the section 7 and is laterally retained by inclined surfaces of sections 5, 6.

If the battery 2 is wider, as shown in FIG. 3, its opposing edges engage the inclined sections 5 and 6 to which its width corresponds. A space 14 (also shown in FIG. 6) is formed between the battery 2 and the section 7 of the first wall 4 so that relative to the battery of FIG. 2, the battery is displaced towards the contact 15. This displacement is compensated by the movable contact 15 as is any variation in the length of the battery.

During experiments it was ascertained that a battery receptacle specified by the invention meets the object of securely retaining batteries having size variations caused by engineering tolerances in all possible directions of movement and consequently of preventing the occurrence of clattering noises. The meeting of the requirement for a mechanically robust and easily operated solution by a battery receptacle as specified by the invention has also been achieved.

Figure 4:
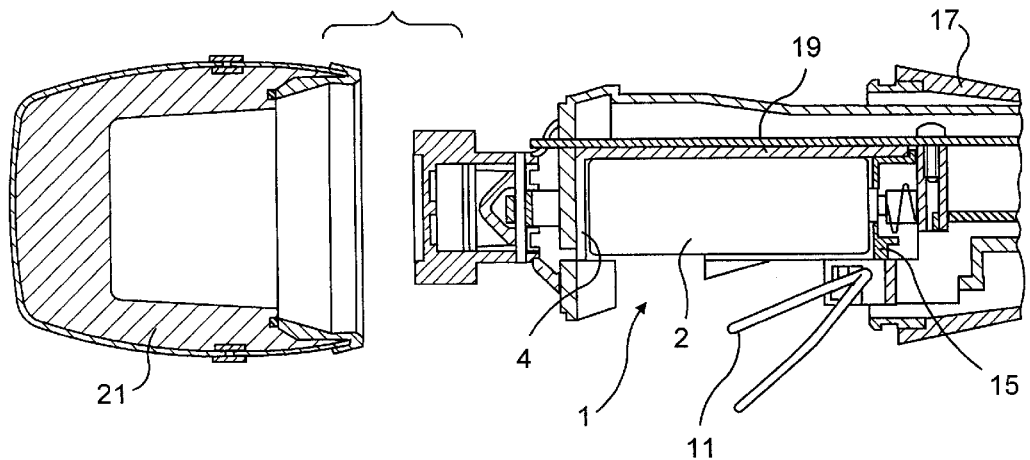
FIG. 4 shows a longitudinal section of a microphone with an opened battery receptacle according to the invention and a battery.
Figure 5:
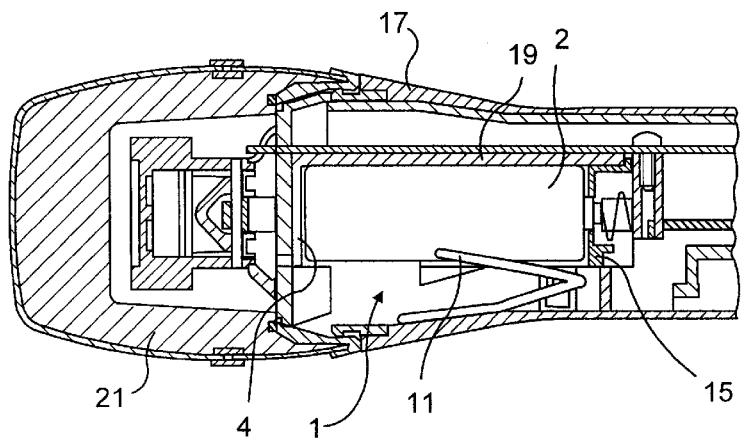
FIG. 5 shows a side elevation in section of the microphone shown in FIG. 4 with a closed battery receptacle.
Figure 6:
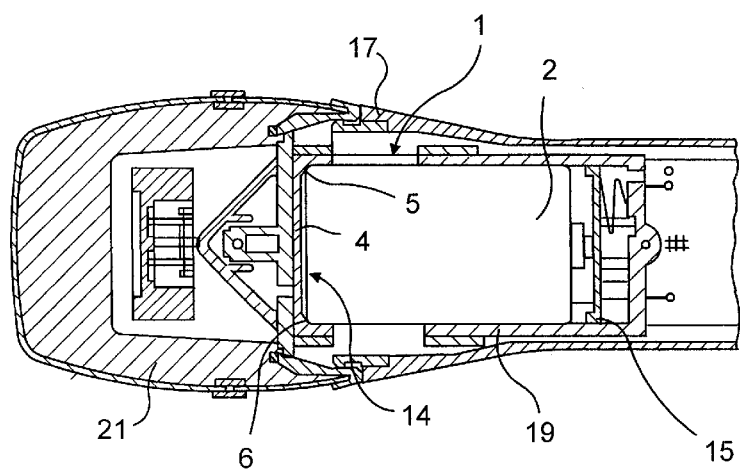
FIG. 6 shows a plan view in section of the microphone shown in FIG. 5.

FIGS. 4 to 6 show a microphone having a battery receptacle 1 according to the invention for a battery 2, having an arresting device 11 provided by a torsion spring, a resiliently mounted contact 15 and a first wall 4. The microphone comprises an upper housing shell 17 and a lower housing shell 19, which forms the battery receptacle 1. In FIG. 4, the microphone is represented with an open battery receptacle. To open the microphone, a cover 21 is released and then a microphone receptacle together with the lower housing shell 19 is withdrawn from the upper housing shell 17, in order to make the battery receptacle 1 accessible. In this case the arresting device 11, which in a closed state of the battery receptacle 1 is clamped between the upper housing shell 17 and the battery 2, swings outwards. In this state the battery 2 can simply be removed from the battery receptacle 1 of the microphone.

FIG. 5 shows the battery receptacle of FIG. 4 closed. The battery 2 is biased by the resilient contact 15 against the first wall 4 and provides a secure electrical connection between the contacts 15 of the battery 2 and those of the battery receptacle 1. In addition, by the displaceable nature of the contact 15, any size variation of the battery 2 in the longitudinal direction is compensated and sliding of the battery in the longitudinal direction is prevented.

The arresting device 11 is provided by a torsion spring which is substantially v-shaped when studied sideways, with one leg section of the torsion spring 11 being biased in the closed state of the battery receptacle 1 against the battery 2 and the other leg section being biased against the upper housing shell 17. In FIG. 5, it is indicated that the torsion spring is further expanded in an unstressed state as permitted by the space between the battery 2 and the upper housing shell 17. The bias of the torsion spring on the battery 2 is produced when the battery receptacle 1 is closed and on so doing the torsion spring is compressed between the battery 2 and upper housing shell 17.

In FIG. 6 can be seen the substantially concave inner side of the first wall 4. The concave inner side of the first wall 4 serves to compensate for the size variations of the battery width and to securely fix the battery.

Figure 7:
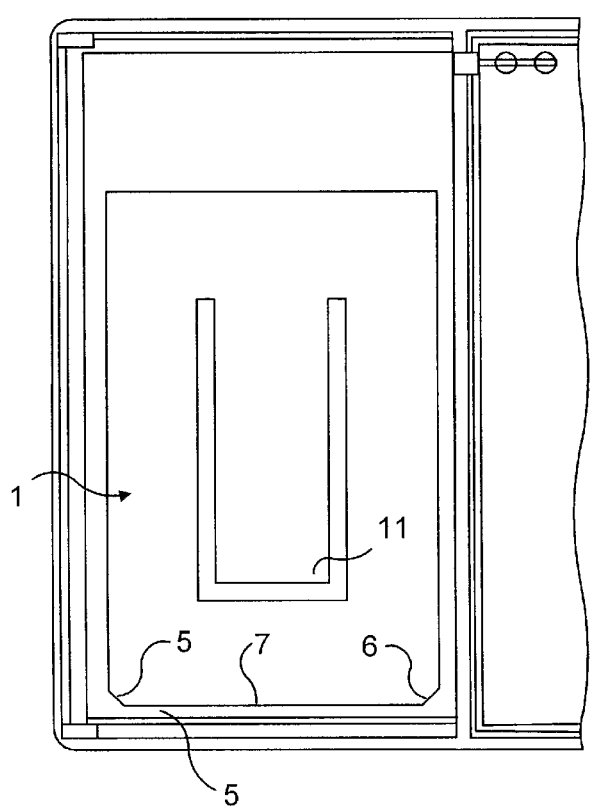
FIG. 7 shows a plan view in section of a second embodiment of a battery receptacle.
Figure 8:
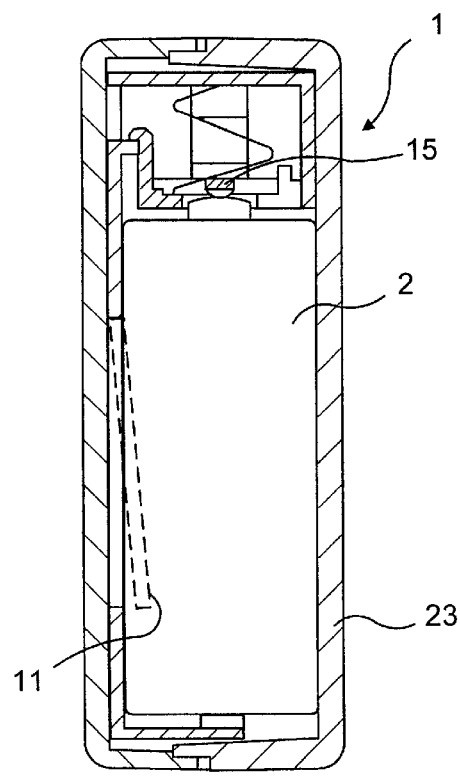
FIG. 8 shows a side elevation in section of the battery receptacle as shown in FIG. 7 with a battery.

FIGS. 7 and 8 show a second embodiment of a battery receptacle 1. The battery receptacle 1 comprises a resiliently mounted contact 15 a fixed lid 23, an arresting device 11 and an inner side of a wall 4 which is formed by wall sections 5 to 7 to be concave. The battery receptacle 1 is produced by injection molding plastics. The arresting device 11 is tongue shaped and protrudes in an unstressed state into the interior of the battery receptacle 1. If a battery 2 is inserted into the battery receptacle 1, the arresting device 11 is forced outwards and biases the battery 2 against the fixed lid 23. Similarly to the other embodiments of the battery receptacle 1, the concave shaped inner side of the first wall 4 compensates for size variations in the width of the battery 2 and consequently ensures lateral retention of the battery 2 in the battery receptacle 1.

While the foregoing description and drawings represent the preferred embodiments of the present invention, it will be obvious to those skilled in the art that various changes and modifications may be made therein without departing from the true spirit and scope of the present invention.

What is claimed is:

1. A battery receptacle for batteries of varying size comprising:
   at least one arresting device: and
   a concave first wall, against which the battery abuts and is laterally retained, said concave first wall abutting against a first surface of the battery perpendicular to a second surface of the battery against which said arresting device abuts.

2. The receptacle according to claim 1, wherein the first wall is formed by several sections in which each provides a mutually inclined surface.

3. The receptacle according to claim 1, wherein the arresting device is a resilient element biased towards the interior of the receptacle.

4. The receptacle according to claim 1, wherein the first wall is hinged and/or detachably fastened to the receptacle.

5. The receptacle according to claim 4, wherein the first wall has a hinged construction and for arresting purposes engages with a retaining device lying opposite a hinge.

6. The receptacle according to claim 5, wherein the retaining device is secured by an applied force.

7. The receptacle according to claim 6, wherein the force is applied by the arresting device.

8. The receptacle according to claim 1, wherein at least one wall is provided with a contact for a 9V battery.

9. The receptacle according to claim 1, further comprising a resilient contact biased towards a third surface of said battery, said third surface being opposite said first surface of said battery.

10. The receptacle according to claim 9, wherein the arresting device is biased towards said battery in a direction perpendicular to a direction towards which the resilient contact is biased.

11. In a battery-operated microphone or electronic device, an improvement comprising:

a battery receptacle for batteries of various size having at least one arresting device and a concave first wall against which the battery abuts and is laterally retained, said concave first wall abutting against a first surface of the battery perpendicular to a second surface of the battery against which said arresting device abuts.

* * * * *